United States Patent [19]

Frame

[11] Patent Number: 5,278,111
[45] Date of Patent: Jan. 11, 1994

[54] ELECTRIC ARC FURNACE DUST AS RAW MATERIAL FOR BRICK

[76] Inventor: Scott W. Frame, 815 Fairway Dr., Anniston, Ala. 36201

[21] Appl. No.: 866,364

[22] Filed: Apr. 10, 1992

[51] Int. Cl.$^5$ .................... C04B 18/04; C04B 35/60; C04B 35/66
[52] U.S. Cl. .................... 501/155; 501/141; 106/286.8; 106/400; 106/401; 264/66
[58] Field of Search .............. 501/155, 141, 151; 106/400, 401, 407, 286.8, 287.18, 453; 264/66

[56] References Cited

U.S. PATENT DOCUMENTS

| | | | |
|---|---|---|---|
| 4,047,884 | 9/1977 | Heian | 106/752 |
| 4,130,439 | 12/1978 | Gashenko et al. | 501/155 |
| 4,764,216 | 8/1988 | Hooykaas | 501/155 |
| 4,911,757 | 3/1990 | Lynn et al. | 501/155 |

FOREIGN PATENT DOCUMENTS 2400037  7/1975  Fed. Rep. of Germany .
53-127511 11/1978 Japan .
58-2264    1/1983  Japan .
0753-828   8/1980  U.S.S.R. .

Primary Examiner—Mark L. Bell
Assistant Examiner—Michael A. Marcheschi
Attorney, Agent, or Firm—Watson, Cole, Grindle & Watson

[57] ABSTRACT

A process for producing brick involves calcining electric arc furnace dust and subsequently mixing the dust with a brick raw material prior to shaping the material into bricks and firing. The precalcination of the EAF dust greatly increases the bulk density of the dust and provides a brick having a much higher compressive strength when compared to bricks incorporating raw dust which has not been precalcined. Volatilized and recondensed heavy metals produced during the calcination process are collected and refined. As a result of the separation and collection of the volatilized heavy metals during the calcination process, substantially no heavy metals are volatilized during the brick firing process.

24 Claims, 2 Drawing Sheets

ELECTRIC ARC FURNACE DUST AS RAW MATERIAL FOR BRICK

FIELD OF INVENTION

The present invention relates to the use of electric arc furnace dust as a raw material in a brick making process.

BACKGROUND OF THE INVENTION

Electric arc furnace (EAF) dust is the dust collected from an electric arc furnace for melting scrap in a steel making process. EAF dust is classified as a hazardous waste by the Environmental Protection Agency and is designated the identification K061. EAF dust has a large heavy metals content, particularly lead, which is the main reason why it is classified as a hazardous material.

Tables I and II below show chemical analysis of EAF dust produced over a four month period during the manufacture of carbon steel (Table 1) and stainless steel (Table 2).

TABLE I

| Carbon Steel Total (%) | Jan. | Feb. | Mar. | Apr. |
|---|---|---|---|---|
| C | 20.0 | 20.0 | 20.0 | 20.0 |
| Ca | 19.60 | 21.00 | 24.50 | 23.10 |
| Fe | 28.8 | 25.50 | 17.10 | 17.40 |
| Zn | 16.40 | 14.30 | 9.85 | 11.90 |
| Mn | 2.20 | 2.05 | 2.25 | 2.15 |
| Pb | 2.55 | 1.70 | 1.48 | 1.21 |
| Na | 0.76 | 0.67 | 0.91 | 0.63 |
| Si | 0.13 | 0.33 | 0.29 | 0.31 |
| Al | 0.41 | 0.39 | 0.37 | 0.26 |
| Mg | 0.75 | 0.55 | 0.48 | 1.05 |
| Cr | 0.17 | 0.25 | 0.33 | 0.42 |
| Cu | 0.21 | 0.12 | 0.12 | 0.09 |
| Ni | 0.13 | 0.08 | 0.12 | 0.02 |
| Cd | 0.04 | 0.02 | 0.02 | 0.02 |
| Mo | 0.02 | 0.02 | 0.06 | 0.05 |
| K | 1.50 | 1.00 | 1.35 | 1.07 |

TABLE II

| Stainless Steel Total (%) | Jan. | Feb. | Mar. | Apr |
|---|---|---|---|---|
| C | 20.0 | 20.0 | 20.0 | 20.0 |
| Ca | 2.50 | 25.2 | 16.0 | 13.0 |
| Fe | 30.0 | 26.1 | 21.6 | 24.3 |
| Zn | 8.10 | 10.5 | 5.60 | 5.35 |
| Mn | 1.90 | 1.95 | 1.75 | 1.65 |
| Pb | 0.90 | 1.10 | 1.01 | 0.71 |
| Na | 0.48 | 0.53 | 0.72 | 0.44 |
| Si | 0.06 | 0.38 | 0.30 | 0.26 |
| Al | 0.28 | 0.40 | 0.45 | 0.23 |
| Mg | 0.85 | 0.48 | 0.62 | 0.88 |
| Cr | 2.27 | 0.30 | 1.90 | 1.90 |
| Cu | 0.16 | 0.10 | 0.11 | 0.09 |
| Ni | 0.11 | 0.07 | 0.10 | 0.04 |
| Cd | 0.02 | 0.02 | 0.01 | 0.01 |
| Mo | 0.45 | 0.02 | 0.04 | 0.06 |
| K | 1.10 | 0.90 | 0.95 | 0.60 |

Tables III and IV show parts by weight of different components found in the leachate of the same carbon steel samples shown in Table I and the leachate of the same stainless steel samples shown in Table II. In Tables III and IV, hexavalent chrome is identified as Cr(6).

TABLE III

| Carbon-Leachate (mg/l) Total | Jan. | Feb. | Mar. | Apr. |
|---|---|---|---|---|
| Cr(6) | 0.01 | 0.41 | 1.48 | 0.44 |
| Cr | 0.22 | 0.46 | 1.67 | 0.45 |
| Pb | 145.00 | 110.00 | 39.00 | 76.80 |
| Cd | 0.02 | 0.02 | 0.02 | 0.02 |
| Ag | 0.04 | 0.04 | 0.05 | 0.06 |
| Ba | 2.50 | 1.60 | 2.40 | 1.10 |
| Hg | 0.0022 | 0.0054 | 0.0011 | 0.0046 |

TABLE IV

| Stainless-Leachate (mg/l) Total | Jan. | Feb. | Mar. | Apr. |
|---|---|---|---|---|
| Cr(6) | 4.30 | 0.68 | 2.63 | 6.30 |
| Cr | 6.40 | 0.83 | 2.63 | 6.62 |
| Pb | 0.26 | 60.5 | 64.0 | 37.2 |
| Cd | 1.93 | 0.02 | 0.02 | 0.02 |
| Ag | 0.04 | 0.06 | 0.05 | 0.06 |
| Ba | 1.2 | 1.40 | 1.0 | 1.0 |
| Hg | 0.0019 | 0.0047 | 0.0010 | 0.0005 |

Tables III and IV indicate that a significant amount of lead and other metals in the dust are prone to leaching out. For this reason, EAF dust cannot be buried in the ground for disposal. Instead, some current methods require combining the dust with a heavy steel material to form a waste product which will not leach. Discarding EAF dust in this manner is an expensive process. EAF dust further poses a health risk due to heavy metal pollution by airborne fumes.

In a typical steel manufacturing process, EAF dust is produced in amounts of between about 0.7 and 1.6% based upon the total amount of steel produced. A need exists for a method of discarding heavy metal dust which method is both inexpensive and safe.

Japanese Publication No. 53-127511 discloses a method of using EAF dust in the production of bricks. The dust is mixed with a brick raw material, formed into bricks, and fired thereby incorporating the hazardous dust into the bricks. According to the Japanese publication, volatilized and recondensed metals produced during the brick firing process are collected in a baghouse on the kiln exhaust.

According to the Japanese publication, raw EAF dust is added in quantities from 30 to 50 weight percent to a normal clay brick mix, and fired in a tunnel kiln at between 630° and 830° C. in a normal manner. Volatilized and recondensed heavy metals are collected in a baghouse on the kiln exhaust. In a reproduction of the process taught in the Japanese publication, EAF dust was added in an amount of 40% by weight to a normal brick body and fired in a similar manner to that described. The resultant bricks were very friable and exhibited compressive strengths which averaged only 690 psi. Table V shows the results of the compressive strength test on five samples made according to the reproduction method. The bricks were tested flatwise. ASTM rated bricks in the United States are required to have a minimum allowable compressive strength of 1500 psi. Thus, a reproduction of the Japanese process failed to produce brick strong enough for U.S. standards. Further, it is expected that a significant amount of heavy metals may leach out of these weak bricks.

TABLE V

| | 40% BY WEIGHT RAW EAF DUST | | | |
|---|---|---|---|---|
| Sample # | Compressive Strength psi (Gross Area) | 5 Hour Submersion in Boiling Water % absorption | 24 Hour Submersion in Cold Water % absorption | Maximum Saturation Coefficient |
| 1 | 710 | 29.9 | 23.3 | 0.78 |
| 2 | 780 | 29.5 | 22.8 | 0.78 |
| 3 | 620 | 30.2 | 23.7 | 0.79 |
| 4 | 630 | 30.1 | 23.6 | 0.78 |
| 5 | 720 | 29.6 | 23.1 | 0.78 |
| Average | 690 | 29.9 | 23.3 | 0.78 |

It is therefore desirable to provide a method of incorporating EAF dust into a raw brick material and producing a brick which exhibits a high compressive strength and no significant leaching of heavy metals.

SUMMARY OF THE INVENTION

The present invention overcomes the problems presented in the prior art by providing a process wherein electric arc furnace dust is first heated so as to be calcined and subsequently mixed with a brick raw material such as a normal clay and/or shale mixture prior to shaping the material into bricks and firing. The precalcination of the EAF dust greatly increases the bulk density of the dust and provides a brick having a much higher compressive strength when compared to the incorporation of raw dust according to the method of the Japanese publication mentioned above. According to the present invention, volatilized and recondensed heavy metals produced during the calcination process are collected and refined. As a result of the collection of the volatilized heavy metal dust during the calcination process, substantially no heavy metals are volatilized during the brick firing process. Therefore, the hot gases present and produced during the brick firing process can be used for other heating requirements during the brick making process without the need for a gas cleaning step to remove volatilized components.

Bricks produced in accordance with the present invention exhibit very high compressive strength and no significant leaching of heavy metals. The process provides a safe and inexpensive method of forming a harmless product from a hazardous waste material.

According to an embodiment of the present invention a method is provided which comprises the steps of calcining electric arc furnace dust at a temperature of about 1040° C. or higher, mixing the calcined dust with a brick raw material to form a mixture comprising up to about 60%, preferably from about 20 to about 60% by weight calcined dust, forming the mixture into bricks, and firing the bricks at a temperature of between about 900° and about 1370° C.

According to another embodiment of the present invention a halogen or reducing agent is added in an amount of up to about 20% by weight to the electric arc furnace dust prior to calcining. The halogen or reducing agent chemically mixes with the heavy metals, lead in particular, to form new metal compounds. These lead compounds are thus formed which have lower volatilization temperatures enabling lead to be almost totally removed from the brick end product by heating at low temperatures.

BRIEF DESCRIPTION OF THE DRAWING

The invention may be more fully understood with reference to the accompanying drawings, wherein.

DETAILED DESCRIPTION OF THE INVENTION

Figure 1:
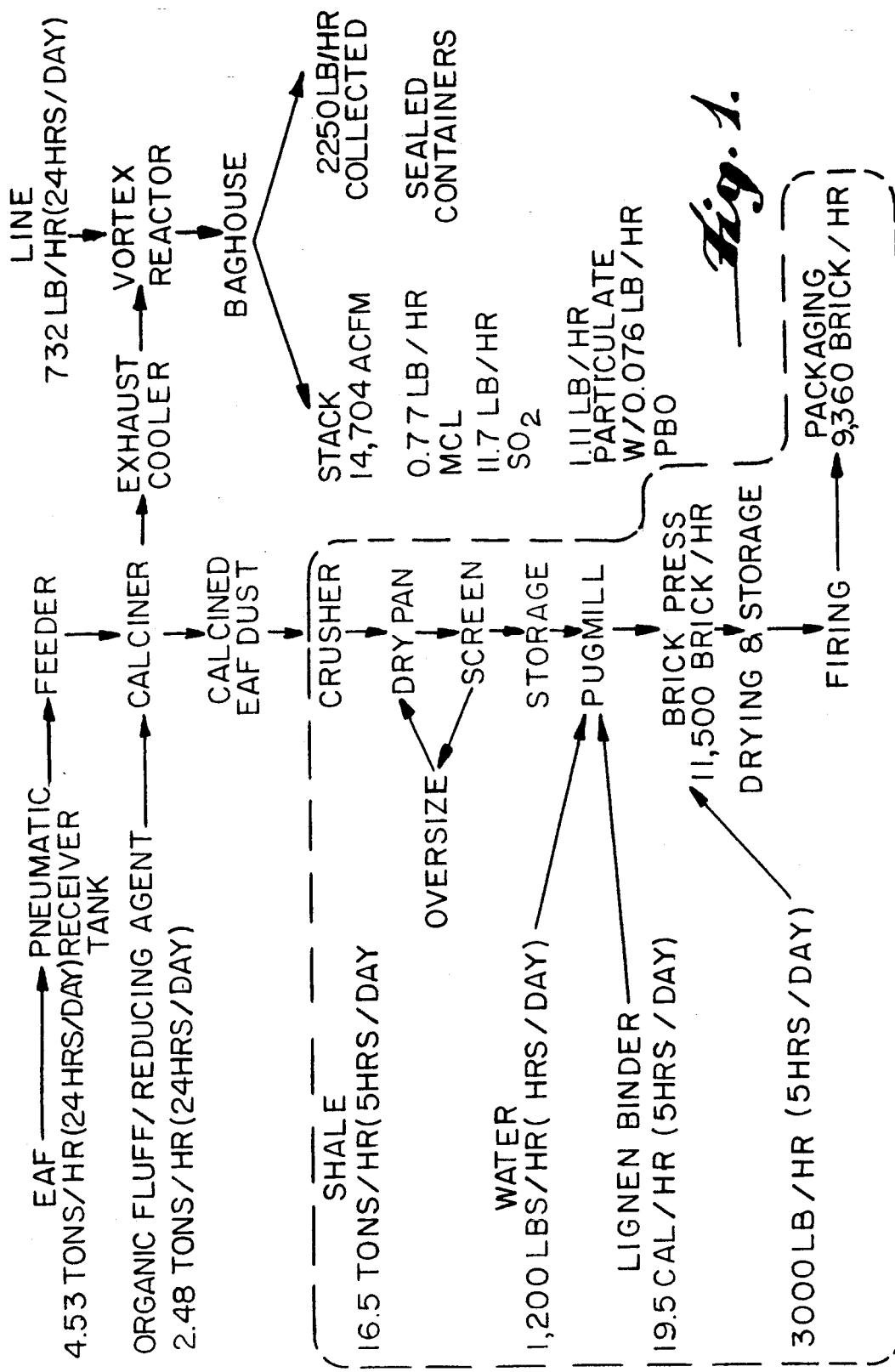
FIG. 1 is a flow diagram showing a process according to an embodiment of the present invention for producing brick.

The present invention utilizes electric arc furnace dust as an additive for a brick manufacturing process. The EAF dust is first calcined by heating it to a temperature of about 1040° C. or higher and then mixed with a brick raw material such as a normal clay and/or shale mixture. The mixture may contain up to about 60% by weight calcined EAF dust. Preferably, the brick raw material is present in an amount of between about 40 and about 80 percent by weight. The raw material incorporating the calcined EAF dust is then processed in a substantially standard manner. One example of a method for processing brick according to the present invention is shown in FIG. 1. In the process shown in FIG. 1, the EAF dust is mixed with a reducing agent and calcined. The exhaust from the calcination is then sent through a pollution control and recovery process. After the calcined dust is mixed with shale in the crusher, the rest of the brick making process continues in a standard manner depicted within the dotted lines. The resulting bricks pass all ASTM compression and absorption tests and all EPA leachate tests including EP toxicity and TCLP.

In a preferred embodiment, a rotary, indirect fired calciner is used. By precalcining the EAF dust, the products of combustion do not come in contact with the brick raw material but are instead cooled as discussed above enabling the heavy metals in the combustion product to condense in a particulate form.

The EAF dust is calcined at a temperature of about 1040° C. or higher so as to substantially increase the bulk density of the dust and produce a calcined EAF dust. In one preferred embodiment, the dust is calcined at a temperature at 1120° C. or higher. Temperatures of greater than 1260° C. are not necessary since an almost complete calcination of the dust occurs at a temperature of between about 1175° and about 1205° C.

During the calcining process of the EAF dust, products of combustion and volatilized heavy metals are cooled to about 200° C. At or above this temperature the heavy metals condense in a particulate form that is easily captured in a baghouse. The captured heavy metals and oxides thereof are sent to secondary metal refineries for further processing to useable elements such as lead for automotive batteries.

After the calcined dust is mixed with standard brick raw material, the mixture is then formed into bricks and fired at a temperature of between about 900° and 1370° C. for a period of about 6 to about 48 hours, depending primarily on the brick raw material and the kiln used. A more preferred range of temperatures for firing the brick is from about 980° to about 1100° C. A more preferred firing period lasts at least 8 hours.

According to the present invention, it has been determined that precalcining the EAF dust prior to its addition to a brick raw material produces bricks upon firing which exhibit numerous significant advantages. The present invention provides a process for an environmentally safe and economical method of recycling a hazardous waste material of which over 800,000 tons are produced annually in the United States. The process also preserves natural resources by replacing clay and shale raw materials with otherwise useless EAF dust. The present invention also improves the quality of bricks produced by increasing the density of the brick. Unique and desirable colors may also be achieved according to the present invention which are substantially uniform throughout the brick body, not just on the surface. In an oxidizing atmosphere, bricks can be produced which have a golden-brown color. In a reducing atmosphere, brick having a dark, chocolate brown color may be produced.

The bricks according to the present invention pass ASTM requirements for compressive strength, cold and boiling water absorption, and saturation coefficient. As can be seen in Tables VIa–VId, bricks made according to the present invention containing from 30% to 60% by weight calcined EAF dust exhibit excellent strength and absorption characteristics.

TABLE VIa

| | 30% BY WEIGHT CALCINED EAF DUST | | | |
|---|---|---|---|---|
| Sample # | Compressive Strength psi (Gross Area) | 5 Hour Submersion Boiling Water % absorption | 24 Hour Submersion Cold Water % absorption | Maximum Saturation Coefficient |
| 1 | 5600 | 14.4 | 10.3 | 0.71 |
| 2 | 5380 | 14.3 | 10.3 | 0.72 |
| 3 | 6310 | 14.3 | 10.3 | 0.72 |
| 4 | 6230 | 14.2 | 10.3 | 0.73 |
| 5 | 7050 | 13.2 | 9.4 | 0.71 |
| Average | 6110 | 14.1 | 10.1 | 0.72 |

TABLE VIb

| | 40% BY WEIGHT CALCINED EAF DUST | | | |
|---|---|---|---|---|
| Sample # | Compressive Strength psi (Gross Area) | 5 Hour Submersion Boiling Water % absorption | 24 Hour Submersion Cold Water % absorption | Maximum Saturation Coefficient |
| 1 | 5390 | 16.0 | 11.5 | 0.72 |
| 2 | 5890 | 15.8 | 11.4 | 0.72 |
| 3 | 5140 | 16.4 | 11.9 | 0.72 |
| 4 | 4670 | 16.3 | 12.0 | 0.73 |
| 5 | 4990 | 16.0 | 11.7 | 0.73 |
| Average | 5220 | 16.1 | 11.7 | 0.72 |

TABLE VIc

| | 50% BY WEIGHT CALCINED EAF DUST | | | |
|---|---|---|---|---|
| Sample # | Compressive Strength psi (Gross Area) | 5 Hour Submersion Boiling Water % absorption | 24 Hour Submersion Cold Water % absorption | Maximum Saturation Coefficient |
| 1 | 3440 | 19.4 | 14.4 | 0.74 |
| 2 | 3470 | 19.9 | 14.9 | 0.75 |
| 3 | 3370 | 19.3 | 14.4 | 0.75 |
| 4 | 3500 | 19.3 | 14.5 | 0.75 |
| 5 | 3780 | 19.0 | 13.8 | 0.73 |
| Average | 3510 | 19.4 | 14.4 | 0.74 |

TABLE VId

| | 60% BY WEIGHT CALCINED EAF DUST | | | |
|---|---|---|---|---|
| Sample # | Compressive Strength psi (Gross Area) | 5 Hour Submersion Boiling Water % absorption | 24 Hour Submersion Cold Water % absorption | Maximum Saturation Coefficient |
| 1 | 1660 | 24.1 | 18.9 | 0.78 |
| 2 | 1860 | 23.5 | 18.4 | 0.78 |
| 3 | 1660 | 23.9 | 19.0 | 0.80 |
| 4 | 1620 | 24.1 | 19.2 | 0.80 |
| 5 | 1730 | 23.4 | 18.9 | 0.81 |
| Average | 1710 | 23.8 | 18.9 | 0.79 |

Figure 2:
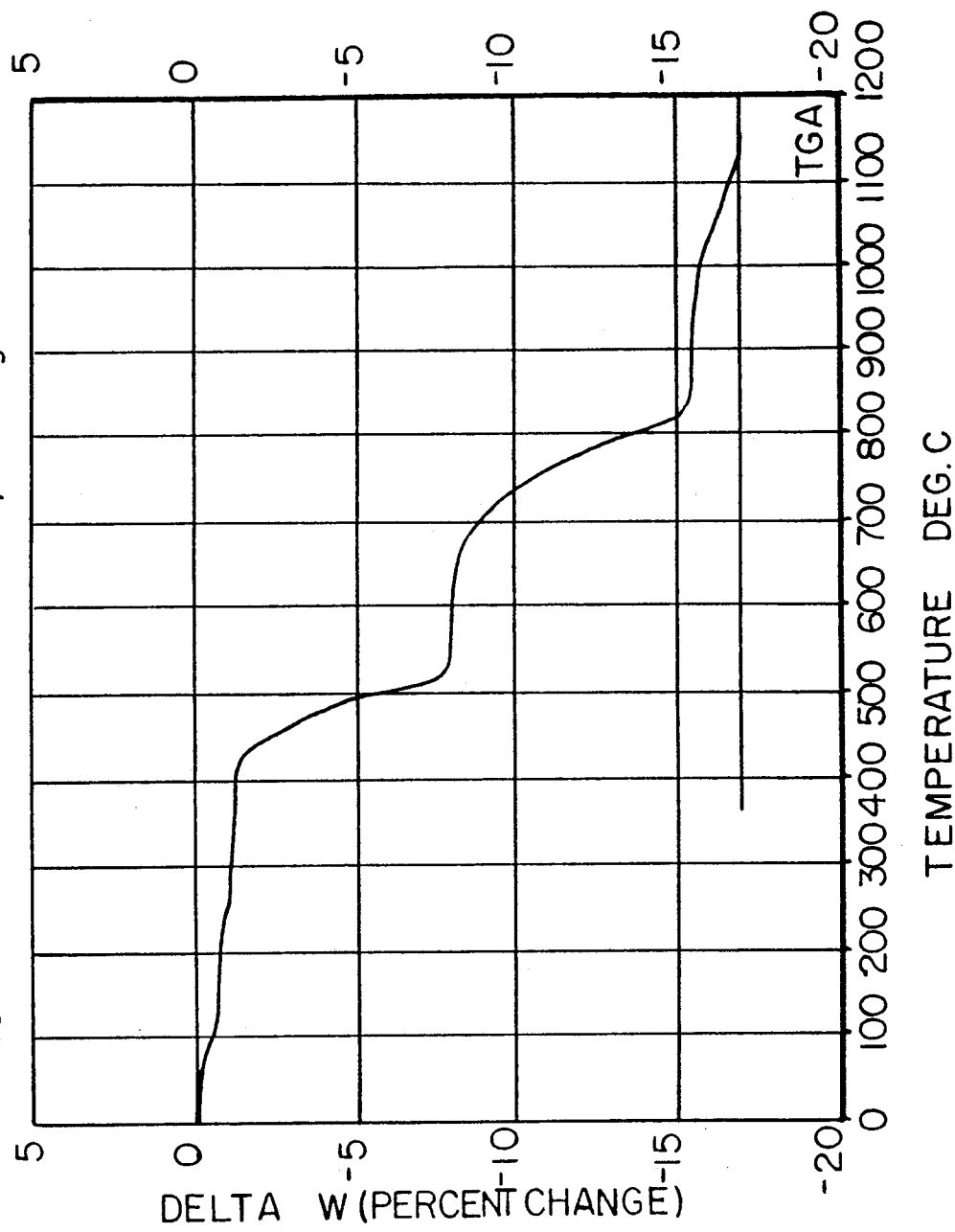
FIG. 2 is a graph showing the percentage of weight change versus temperature of an EAF dust sample during calcination.

Thermal gravimetric analysis (TGA) and lab furnace calcining tests, shown in FIG. 2 and Table VII, indicate that upon heating to 1120° C., EAF dusts loses about 17% of its weight. The dust also shrinks or agglomerates such that its bulk density increases by a factor of greater than 4. The shrinkage of the EAF dust accounts for the high percentage of voids and the extremely low compressive strength in the brick made according to the method of the Japanese publication mentioned above. Two samples comprising raw EAF dust were put into clay crucibles (1.2 in. sample depth). The crucibles were placed into a preheated electric kiln set at 1121° C. (2050° F.). One crucible was taken out after 0.5 hr. and the other after 1.0 hr. The powder had a considerable shrinkage and became semi-fused into small cones. The resultant properties of the dust are shown in Table VII below.

TABLE VII

| | | |
|---|---|---|
| WEIGHT LOSS: | 0.5 hr. sample | 17.10% |
| | 1.0 hr. sample | 17.12% |
| BULK DENSITY: | Green | 33.0 lb/ft$^3$ |
| | 0.5 hr. | 129.3 lb/ft$^3$ |
| | 1.0 hr. | 139.5 lb/ft$^3$ |
| COLOR: | Green | Medium brown |
| | 0.5 hr. | Medium brown w/green tones |
| | 1.0 hr. | Medium brown w/green tones |

As can be seen, the bulk density increased by a factor of greater than 4 in the 1.0 hour sample. Although the samples were agglomerated into cones, they could still be broken apart with prodding. All of the powder would go through a 140 mesh screen. The angle of repose was about 35 degrees. Calcination times generally range from about 0.5 to about 1 hour. Preferably, a calcination period of at least 0.5 hour is employed.

The weight loss is attributed to free water loss between 25° and 240° C., carbon oxidation between 240° and 440° C., and $ZnCO_3$ loss between 540° and 850° C. The weight loss between 920° and 1120° C. is unknown but believed to be from volatilized lead compounds.

Lead is the predominant heavy metal contaminant in EAF dust. Elemental lead boils at 1751° C. and lead oxide (PbO) boils at about 1472° C. These temperatures are much higher than typical 1100° C. firing temperatures for brick. Lead in the brick produced by the method set forth in the Japanese publication discussed above remains in the brick product and may possibly leach out in service.

According to an embodiment of the present invention, lead in the EAF dust is volatilized at low temperatures of approximately 1100° C. Under some conditions, the lead can be almost totally removed from the brick end product at these low temperatures. In order to volatilize the lead at these temperatures and even lower temperatures, such at 1040° C., small amounts of reducing agents or halogens are added to the lead to produce lower boiling lead compounds, e.g. lead chloride. Only a very small amount of reducing agent or halogen is necessary to produce the new lower boiling lead compounds. According to an embodiment, up to about 6% by weight halogen is added to the dust prior to calcining.

According to one embodiment of the present invention, a reducing agent is added in an amount of up to about 20% by weight based on the total weight of the electric arc furnace dust prior to calcining the dust. The reducing agent is preferably a scrap material or other cheap material which may itself contain heavy metals. One example is scrap wire insulation which, like EAF dust, is expensive to dispose of. Other reducing agents which may be used include, but are not limited to, coal, coke, sawdust and waste oils. As little as 1% reducing agent has a significant effect on the volatilization of lead from the EAF dust. In fact, as shown in Table VIII below, the addition of 1% coal yields even better results than the addition of 2 or 4% coal. By adding 1% coal to the EAF dust, the weight percent lead in the dust dramatically decreased from 7.408 weight percent to only 0.802 weight percent. Practically no reducing agent remains in the finished brick.

TABLE VIII

| | WEIGHT % Pb |
|---|---|
| Raw Electric Arc Furnace (EAF) dust | 7.408 |
| EAF dust calcined with 1% NaCl | 0.915 |
| EAF dust calcined with 2% NaCl | 0.565 |
| EAF dust calcined with 4% NaCl | 0.658 |
| EAF dust calcined with 1% Coal | 0.802 |
| EAF dust calcined with 2% Coal | 1.064 |
| EAF dust calcined with 4% Coal | 1.154 |

Any of the halogens may be added to produce a similar effect as that of the reducing agents. The preferred halogens are the most inexpensive ones, for example, chlorine from sodium chloride. As shown in Table VIII, the addition of 2% by weight sodium chloride based on the total amount of raw electric arc furnace dust gives the greatest reduction in total lead in the calcined product, specifically, a 92.4% reduction. Depending upon the composition of the halogen-containing additive, amounts between about 1 and about 6% by weight are preferred. Only a trace amount of the halogen remains in the finished brick.

While the range of calcination temperatures between 1037° and 1260° C. is preferred, it has been found that EAF dust containing greater amounts of calcium require the higher range of these temperatures.

Bricks produced according to the present invention also exhibit minimal leaching of heavy metals. The brick easily passes TCLP requirements for leaching. In one example, an EAF dust to which 4% coal was added was calcined at about 1120° C. The calcine was crushed and leach tested according to the EPA's well known TCLP test. Only 0.18 milligrams of lead per liter leached out of the reduced calcine. It is expected that leaching rates of about 0.2% or lower are possible in any of the calcines produced according to the present invention. The maximum allowable leach rate in the United States is 5.0 mg/l.

The low level of leaching provides distinct operational advantages for brick manufacturing in that the calcine may be stored without risk of it leaching into the environment. While the EAF dust is stored, other non-EAF dust brick may be manufactured at the plant. The prior art, on the other hand, requires that the dust be introduced directly into the brick raw material and not stored, thus limiting production of other types of brick at the plant.

The bricks produced according to the present invention exhibit compressive strengths and leaching properties which pass all requirements of the Environmental Protection Agency. The process takes advantage of an otherwise hazardous waste material while at the same time preserving natural resources.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A method for producing bricks containing electric arc furnace dust produced in an electric arc furnace employed to melt scrap in a steel making process, said method comprising the steps of:

calcining electric arc furnace dust by heating said dust to a temperature of about 1040° C. or higher to increase the bulk density of the dust and form calcined electric arc furnace dust;

mixing said calcined dust with a brick raw material comprising clay, shale or mixtures thereof to form a mixture comprising said calcined dust present in an amount of up to about 60 percent by weight;

forming said mixture into bricks and firing the formed bricks at a temperature of between about 900° and about 1370° C.

2. A method as in claim 1, wherein said mixture comprises from about 20 to about 60 percent by weight said calcined dust.

3. A method as in claim 1, wherein said electric arc furnace dust is calcined at a temperature of up to about 1260° C.

4. A method as in claim 1, wherein said electric arc furnace dust is calcined at a temperature of about 1120° C. or higher.

5. A method as in claim 1, wherein said electric arc furnace dust is calcined at a temperature of between about 1175° and about 1205° C.

6. A method as in claim 1, further comprising adding to said electric arc furnace dust at least one reducing agent in an amount of up to about 20 percent by weight, based on the total weight of said electric arc furnace dust, prior to calcining said dust.

7. A method as in claim 6, wherein said reducing agent is at least one member selected from the group consisting of coal, coke, sawdust, waste oils and scrap wire insulation.

8. A method as in claim 6, wherein said reducing agent is coal added in an amount of about 1 percent by weight based on the electric arc furnace dust, prior to calcining said dust.

9. A method as in claim 1, further comprising adding to said electric arc furnace dust at least one halogen in an amount of up to about 6 percent by weight, based on the total weight of said electric arc furnace dust, prior to calcining said dust.

10. A method as in claim 9, wherein said halogen is chlorine.

11. A method as in claim 9, wherein said halogen is chlorine present in an amount of about 2 percent by weight based on the amount of the electric arc furnace dust.

12. A method as in claim 1, wherein the bulk density of the calcined electric arc furnace dust is at least about 129.3 pounds per cubic foot.

13. A method as in claim 1, wherein the bulk density of the calcined electric arc furnace dust is at least about 139.5 pounds per cubic foot.

14. A method as in claim 1, wherein the bulk density of said calcined electric arc furnace dust is at least 4 times greater than the bulk density of said dust prior to calcining.

15. A method as in claim 1, wherein said bricks are fired at a temperature of between about 980° and about 1100° C.

16. A method as in claim 1, wherein said dust is calcined for at least 0.5 hour.

17. A method as in claim 1, wherein said bricks are fired for a period of at least 8 hours.

18. A method as in claim 1, wherein during said heating step, gas to heat the dust does not contact the dust, said method further comprising the subsequent step of recirculating the heating gas for further heat requirements, said recirculating step being free of any gas cleaning step.

19. A brick comprising 40 to 80 percent by weight of a brick raw material selected from the group consisting of clay, shale and mixtures thereof and 20 to 60 percent by weight of an electric arc furnace dust, wherein said dust has been precalcined at a temperature of about 1040° C. or higher and has a bulk density of at least about 129.3 pounds per cubic foot.

20. A brick as in claim 19, wherein said electric arc furnace dust has a bulk density which is at least 4 times greater than the bulk density of the dust prior to being calcined.

21. A brick as in claim 19, further comprising at least one halogen in a trace amount.

22. A brick as in claim 19, having a compressive strength of at least 1500 psi.

23. A brick as in claim 19, having a leach rate of about 0.2 mg/L or less.

24. A brick as defined in claim 23, wherein said brick has a compressive strength of at least 1500 psi.

* * * * *

UNITED STATES PATENT AND TRADEMARK OFFICE
CERTIFICATE OF CORRECTION

PATENT NO. : 5,278,111
DATED : January 11, 1994
INVENTOR(S) : Scott W. Frame

It is certified that error appears in the above-indentified patent and that said Letters Patent is hereby corrected as shown below:

On the Title Page:

In the upper-right hand corner of the flow chart change the word "line" to --lime--.

In the Drawings:

In the upper right-hand corner of the flow chart shown in Fig. 1, change the word "line" to --lime--.

Signed and Sealed this

Thirteenth Day of September, 1994

Attest:

BRUCE LEHMAN

*Attesting Officer*      *Commissioner of Patents and Trademarks*